United States Patent [19]

Hersh et al.

[11] Patent Number: 5,704,362
[45] Date of Patent: Jan. 6, 1998

[54] METHOD FOR OSCILLOMETRIC BLOOD PRESSURE DETERMINATION EMPLOYING CURVE FITTING

[75] Inventors: Lawrence T. Hersh; Bruce Friedman; Richard Medero, all of Tampa, Fla.

[73] Assignee: Johnson & Johnson Medical, Inc., Arlington, Tex.

[21] Appl. No.: 106,280

[22] Filed: Aug. 13, 1993

[51] Int. Cl.$^6$ .................................................. A61B 5/00
[52] U.S. Cl. ........................... 128/680; 128/681; 128/682
[58] Field of Search ................................. 128/677–686; 364/413.03

[56] References Cited

U.S. PATENT DOCUMENTS

| | | | |
|---|---|---|---|
| 4,360,029 | 11/1982 | Ramsey, III | 128/681 |
| 4,461,266 | 7/1984 | Wood et al. | 128/681 |
| 4,494,034 | 1/1985 | Ramsey, III | 128/681 |
| 4,501,280 | 2/1985 | Wood | 128/677 |
| 4,543,962 | 10/1985 | Medero et al. | 128/682 |
| 4,546,775 | 10/1985 | Medero | 128/681 |
| 4,592,365 | 6/1986 | Georgi | 128/680 |
| 4,627,440 | 12/1986 | Ramsey et al. | 128/682 |
| 4,638,810 | 1/1987 | Ramsey et al. | 128/681 |
| 4,697,596 | 10/1987 | Link | 128/681 |
| 4,754,761 | 7/1988 | Ramsey et al. | 128/683 |
| 4,776,344 | 10/1988 | Shirasaki et al. | 128/681 |
| 4,796,184 | 1/1989 | Bahr et al. | 128/681 |
| 4,807,631 | 2/1989 | Hersh et al. | 128/633 |
| 4,848,901 | 7/1989 | Wood | 356/41 |
| 4,889,133 | 12/1989 | Nelson et al. | 128/681 |
| 4,905,704 | 3/1990 | Walloch | 128/682 |
| 4,917,098 | 4/1990 | Murase | 128/677 |
| 4,922,918 | 5/1990 | Ruiter | 128/681 |
| 4,926,873 | 5/1990 | Frankenreiter | 128/681 |
| 4,949,710 | 8/1990 | Dorsett et al. | 128/680 |
| 4,953,557 | 9/1990 | Frankenreiter | 128/677 |
| 4,974,597 | 12/1990 | Walloch | 128/680 |
| 4,984,577 | 1/1991 | Frankenreiter | 128/681 |
| 5,052,397 | 10/1991 | Ramsey et al. | 128/682 |
| 5,054,494 | 10/1991 | Lazzaro et al. | 128/677 |
| 5,146,414 | 9/1992 | McKown et al. | 128/713 |
| 5,170,795 | 12/1992 | Ramsey et al. | 128/682 |
| 5,224,484 | 7/1993 | Newell | 128/680 |

OTHER PUBLICATIONS

Nonlinear Parameter Estimation by Jonathan Bard, 1974, pp. 286–341.
Nonlinear Lp–Norm Estimation by Rene Gonin and Arthur H. Money, 1989 pp. 293–300 and 1–119.
SAS User's Guide, 1979 Introductory Guide, pp. 317–329.
Computation of the Estimates I: Unconstrained Problems, pp. 83–140.

*Primary Examiner*—Robert L. Nasser, Jr.
*Attorney, Agent, or Firm*—Woodcock Washburn Kurtz Mackiewicz & Norris LLP

[57] ABSTRACT

A method of measuring blood pressure where a plurality of oscillometric data values are measured from a subject at a plurality pressure levels, a function curve having the shape of an oscillometric envelope is selected and computational model fit to the data, using the Gauss-Marquardt method of model fitting. Once the curve is model fit, blood pressure is measured using the oscillometric method. Included in the step of model fitting is the step of computing the parameter of the function curve that minimizes the error between the function curve and the data values at the respective pressure levels thereby approximating the oscillometric envelope based upon data values.

14 Claims, 2 Drawing Sheets

METHOD FOR OSCILLOMETRIC BLOOD PRESSURE DETERMINATION EMPLOYING CURVE FITTING

BACKGROUND OF THE INVENTION

1. Field of the Invention

This invention relates to automated blood pressure monitors. More particularly, this invention relates to automated blood pressure monitors which employ oscillometric methods of detection characterized by enhanced systolic, diastolic and mean blood pressure determinations.

1. Description of the Background Art

The heart muscles of humans (and other meals) periodically contract to force blood through the arteries of the human. As a result, irregularly-shaped pressure pulses exist in these arteries and cause them to flex or oscillate. The base line pressure for these pulses is known as the diastolic pressure and the peak pressure for these pulses is known as the systolic pressure. A further pressure value, known as the "mean arterial pressure" (MAP), represents a time-weighted average of the blood pressure.

In the past, various techniques and devices have been used for measuring one or more of these blood pressure values. The most common method involves applying a pressure cuff about the upper arm of the human and inflating it so as to stop the flow of blood in the brachial artery. The pressure is then slowly relieved while a stethoscope is used on the distal portion of the artery to listen for pulsating sounds, known as Korotkoff sounds, that accompany the reestablishment of blood flow in the artery. As the pressure in the cuff is reduced further, the Korotkoff sounds eventually disappear. The cuff pressure at which the Korotkoff sounds first appear during deflation of the cuff is a measure of the systolic pressure and the pressure at which these sounds disappear is a measure of the diastolic pressure. This method of blood pressure detection is generally known as the auscultatory method.

Various devices are well known in the prior art for automatically performing blood pressure measurements by the auscultatory method. These devices employ a pump to automatically inflate a pressure cuff and a microphone to convert the Korotkoff sounds into electrical signals which are easily detected by various types of circuits. Other techniques have also been used to detect blood pressure from outside the subject's body, e.g., via Doppler shifts in ultrasonic waves reflected by the artery wall. In addition, there are intrusive devices that are inserted directly into the blood vessels for measurement of the pressure. However, the most commonly used method for measuring blood pressure, other than the auscultatory method, is the oscillometric method.

The oscillometric technique is based on the fact that the pumping of blood through the arteries by the heart causes the arteries to flex. Even in the area adjacent to or within a pressure cuff applied to the arm of a human, these pressure variations exist. In fact, the pressure variations will pass from the artery through the arm of the human with attenuation and into the pressure cuff itself. While these pressure variations are small compared to the typical pressure applied by the cuff, they are nevertheless detectable by a transducer located to measure the pressure within the cuff. It has been found that these pulses, called "complexes", have a peak-to-peak amplitude which is minimal for applied cuff pressures above the systolic pressure and below the diastolic pressure. The amplitude of these complexes, however, rises to a maximum value. Physiologically, the cuff pressure at this maximum value approximates the MAP. It has further been found that the complex amplitudes of cuff pressures equivalent to the systolic and diastolic pressures have a fixed relationship to this maximum value. Thus, the oscillometric method is based on measurements of detected complex amplitudes at various cuff pressures.

As disclosed in U.S. Pat. Nos. 4,360,029 and 4,394,034 both entitled "Automatic Mean Blood Pressure Reading Device", automated blood pressure measuring devices operating according to the oscillometric method have been proposed in which the peak-to-peak amplitude of the pressure complexes are detected at various applied cuff pressures. The amplitudes of these complexes, as well as the applied cuff pressure, are stored together as the device automatically changes the cuff pressure over the range of interest. These peak-to-peak complex amplitudes define an oscillometric "envelope" and are evaluated to find the maximum value and its related cuff pressure, which is approximately equal to the MAP. The cuff pressure below the MAP value which produces a peak-to-peak complex amplitude having a certain fixed relationship to the maximum value, is designated as the diastolic pressure. Likewise, the equivalent cuff pressure above the MAP value which results in complexes having an amplitude with a certain fixed relationship to that maximum value, is designated as the systolic pressure. The relationships of systolic and diastolic pressures, respectively, to the maximum value, are empirically derived ratios which assume varying levels depending on the preferences of those of ordinary skill in the art. Generally, these pressures are calculated in the range of 40 to 80% of the maximum value.

The reliability and repeatability of these methods hinges on the ability to accurately determine the oscillation magnitudes of the complexes. There are several barriers to accurate and reliable oscillation magnitude determination. First, artifacts caused by patient motion and other effects are nearly always present. These artifacts are superimposed upon the desired oscillation signal, causing it to be distorted. Second, many of the properties of the desired oscillation signal are not consistent from patient to patient, or even from oscillation to oscillation for a given patient. One factor which affects the consistency of these properties would include irregular heart rate.

The prior art methods which follow the oscillometric methods have employed a variety of schemes to improve their accuracy and the reliability. Most often, the schemes involve artifact detection and rejection. Examples of artifact rejection algorithms can be seen for example in the U.S. Pat. Nos. 4,360,029 and 4,394,034 noted above (artifact rejection algorithms look at, inter alia, select parameters such as peak height or time rate of change of successive samples or series of samples) and in U.S. Pat. No. 4,546,775 entitled "Detection of Blood Pressure Complexes in Automated Vital Signs Monitors" (rejection is based upon signal slope that is uncharacteristic of the true complex). These techniques will accept only pulses with certain properties, such as specific rise times, or certain consistencies, such as a consistent time between oscillations. While these techniques may work well in some cases, they may fail in other cases. Such artifact rejection schemes tend not to work well with very old or very ill patients, as such properties or consistencies may simply not be present. In these cases, these prior methods can yield unreliable measurements of blood pressure or no measurement at all.

Another disadvantage of the prior techniques is that the artifact rejection procedures often require a series of measurements to determine whether consistency is present. More repetition of necesssary tests or measurements increases the overall time for the blood pressure determination.

In many situations, the speed with which blood pressure readings are determined is not critical, although a delay in making a determination may represent an inconvenience to the patient. However, in certain situations, for example, during surgery or during the emergency treatment of patients who have suffered severe trauma, it is often necessary to obtain the blood pressure determination quickly and to obtain repeated determinations over a period of time. With the automatic oscillometric blood pressure monitors known from the prior art, the cuff pressure is either increased in increments until the desired readings are obtained (an incrementing device) or rapidly brought to a high pressure, which is thought to be above systolic pressure, and then decreased in increments (decrementing device). Since normal blood pressure lies in the range between about 70 and 120 millimeters of mercury, one technique for improving the speed with which the blood pressure readings can be taken is to start with a reasonably high value of initial pressure, for example, 50 to 70 millimeters of mercury, when an incrementing device is used. Similarly a decrementing device could start with a relatively low pressure with respect to systolic, for example, 120 to 140 millimeters of mercury. Thus, the portions of the pressure range where it is unlikely that useful information will be obtained are skipped over and the measurement speed is increased.

The difficulty with skipping part of the pressure range to speed up the process is that a person in shock may have such a low blood pressure that the automated operation may completely miss significant information, e.g., the diastolic pressure. Likewise, if a person is suffering from arterial disease, his blood pressure may be extremely high and a decrementing device with too low an initial cuff pressure may not detect the systolic pressure. Besides the people with heart disease or who are in shock, certain people naturally have blood pressures outside the normal range. Typical of this is the blood pressure of long distance runners which tends to be much lower than that of the general population. With such people, a blood pressure reading may not be possible with a device in which part of the pressure range is skipped in order to obtain faster readings.

Some blood pressure monitors may be reset upon failing to get a reading, thereby causing the monitor to search for blood pressure in a lower or higher range as indicated. However, in critical situations in which speed is of the essence, this may not be accomplished easily. In particular, the operator of the monitor may assume that the failure to read a blood pressure is due to a failure of the monitor, as opposed to an abnormally high or low pressure in the test subject. Thus, valuable time may be lost in trying to check out the monitor. Further, during emergency treatment or surgery, it may not be convenient for the operator, for example, a paramedic or an anesthesiologist, to reprogram the monitor since he or she may be engaged in other critical life saving operations.

As set forth in U.S. Pat. No. 4,461,266 entitled "Adaptive for Incremental Blood Pressure Monitor", prior art blood pressure monitors may operate in an adaptive mode in which the monitor initially moves to the normal range of expected blood pressure to take readings. Should the readings show that the actual blood pressure values are outside the normal range, the monitor automatically calculates the direction in which the cuff pressure must change in order to get a reading and then adapts its operation to obtain the readings. More specifically, in one particular embodiment, the pressure cuff is pumped up to the expected diastolic pressure and then incrementation occurs. If increasing pressures are not detected, the pressure cuff is deflated to a lower expected diastolic pressure and then incrementation occurs again. This process repeats itself until increasing complex amplitude pressures are detected. Once increasing pressures are detected, the monitor operates as usual to detect the maximum value. The systolic and diastolic pressures may then be computed as a fixed fraction of the maximum value. In another embodiment, an envelope of data points may be obtained over a shorter pressure range and then MAP is determined, and systolic and diastolic computed therefrom as is conventional. Should it be realized that the diastolic pressure was not detected, the pressure cuff may be relieved enough to reduce it to the initial pressure for which there was a successful measurement of MAP. Then the cuff pressure is decremented to the diastolic pressure location. In this manner, the pressure cuff need not be deflated to zero. The search for relevant blood pressure values occurs automatically in a relatively short period of time.

Another technique for rapidly determining MAP in a stat mode is disclosed in U.S. Pat. No. 4,543,962 entitled "Method of Automated Blood Pressure Detection". In this patent, the conventional two oscillatory complexes per pressure cuff level are analyzed at the first two or three decrements of the pressure cuff. If these oscillatory complexes are determined not to constitute artifacts, then only a single oscillatory complex is analyzed at subsequent decrements of cuff pressures. In this manner, the time required to proceed through the pressure decrementing steps is significantly reduced while increasing patient comfort by speeding the deflation and decreasing the time at which arterial occlusion takes place.

As disclosed in U.S. Pat. Nos. 4,638,810 and 4,754,761, the stored complex magnitudes that define the oscillometric envelope may be corrected for aberrations. In one technique, if aberrations representative of an artifact are detected at a pressure cuff level, the complex magnitude for that level is assumed to be an average of the complex magnitudes at adjacent levels. In a similar fashion, if the complex magnitudes of adjacent levels are equal, then the first complex magnitude is recomputed as an average of the magnitude at its adjacent levels. In this manner, the envelope is substantially corrected to eliminate aberrations.

As also disclosed in these patents, linear interpolation techniques may be employed for interpolating the systolic and diastolic blood pressure at those pressures which lie on the envelope between two adjacent complex amplitudes. A similar interpolation technique may be employed by computing MAP based upon a first complex amplitude on one side of the measured MAP, interpolating a complex amplitude on the other side, and then computing a new MAP based upon these two data points.

As shown in U.S. Pat. No. 4,984,577, entitled "Oscillometric Non-Invasive Method for Measuring Blood Pressure and Apparatus for Automated Oscillometric Blood Pressure Measuring", other linear interpolation techniques exist which employ two adjacent complex amplitudes to linearly interpolate MAP and systolic and diastolic pressures. As set forth in this patent, it is recognized that if more sophisticated equipment was available, the envelope between the adjacent peak amplitudes could be approximated by graphs other than a triangle.

Finally, as disclosed in U.S. Pat. Nos. 4,889,133 and 4,949,710, methods have been developed which utilize the principles of Kalman Filter theory for algorithmically predicting the next pulse amplitude based upon the amplitudes of prior pulses, and then accept or reject (as an artifact) the next pulse if it is not within a certain range of the prediction.

These methods also include algorithms for adjusting each of the pulse data points based upon the difference between a measured data point and a corresponding predicted data value for a given cuff pressure level. This pulse adjusting can then be used to smooth the curves that had been fitted from previously developed data points. Unfortunately, the Kalman Filter theory results in the curves being computed from data point to data point. As disclosed, the curves are not utilized from one determination to another to predict complex properties therefore each blood pressure determination requires significant data acquisition. Delays in obtaining determinations may therefore be encountered.

A primary object of this invention is to provide an automated oscillometric blood pressure monitor which requires significantly fewer measured complex amplitudes to define the oscillometric envelope used for computation of the MAP and systolic and diastolic pressures, thereby increasing the speed with which a patient's blood pressure may be determined and displayed to the attending physician.

Another primary object of this invention is to provide an automated oscillometric blood pressure monitor in which a curve is computationally fitted to the oscillometric envelope defined by complex amplitudes at varying cuff pressures thereby enabling MAP and systolic and diastolic blood pressures to be more accurately computed.

Another primary object of this invention is to provide an automated oscillometric blood pressure monitor wherein a curve is computationally fitted to the oscillometric envelope defined by complex amplitudes at varying cuff pressures, wherein the curve fitting computations are inherently immune to aberrations caused by artifacts.

Another primary object of this invention is to provide an automated oscillometric blood pressure monitor in which a curve is computationally fitted to the oscillometric envelope defined by complex amplitudes at varying cuff pressures and wherein the curves of prior blood pressure determinations are stored and one or more of the data points thereof are used in subsequent determinations, thereby significantly reducing the number of complex amplitudes that need be measured for subsequent determinations.

Another primary object of this invention is to provide an automated oscillometric blood pressure monitor in which a curve is computationally fitted to the oscillometric envelope defined by complex amplitudes at varying cuff pressures and wherein the curves of prior blood pressure determinations are stored and used in a weighted-averaged prediction of future determinations, thereby significantly reducing the number of complex amplitudes that need be measured for successive determinations.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention is defined by the claims taken in conjunction with the followings drawings.

DESCRIPTION OF THE BASIC METHOD OF THE INVENTION

For the purpose of summarizing this invention, this invention comprises a method for computationally fitting a curve to an oscillometric "envelope" defined by complex amplitude data points which are measured by a blood pressure monitor at varying cuff pressures. The fitted curve may then be used to compute an approximation of the mean arterial pressure (MAP) data point, which is approximately at the maximum value of the fitted curve and is therefore easily determined by computing the point on the fitted curve in which the first derivative equals zero. From this maximum value data point, the systolic and diastolic pressures may be computed as fixed percentages of the maximum value. In this manner, the systolic data point and the diastolic data point along the fitted curve may each be precisely computed and therefore their respective pressures may be precisely determined.

Preferably, a Gaussian-shaped function is computationally model fitted to the oscillometric envelope. A Gaussian curve is preferably used because envelopes in general have a bell-shaped appearance. However, it shall be understood that other functions may be employed during the curve fitting methods such as, for example, a polynomial, a sine or cosine function, or a gamma function. The books entitled *Nonlinear Parameter Estimation* authored by Yonathan Bard and published by Academic Press, Inc. in 1974 and *Nonlinear $L_p$-Norm Estimation* authored by Rene Gonin and Arthur H. Money and published by Marcel Dekker, Inc. in 1989, the disclosures of which are hereby incorporated by reference herein, describe many curve fitting methods that may be employed without departing from the spirit and scope of this invention. Further, as disclosed in the *SAS Introductory Guide*, 1978 Edition, and the *SAS User's Guide*, 1979 Edition, both published by the SAS Institute, Inc. of Cary, N.C., the disclosures of which are hereby incorporated by reference herein, there exists many computer programs that implement the desired curve fitting method.

The curve fitting computations preferably employ the well-known Marquardt method which is a combination of the steepest descent on a sum-squared error function and Gauss-Newton zero-finding for an observation function. Note that in the case of the Gaussian function, the optimization search is over three variables.

Importantly, the method of the present invention for computationally fitting a curve to an oscillometric envelope inherently constrains the envelope to the known reasonable shape of the Gaussian function. Hence, the term "curve fitting" may therefore be more accurately described as "model fitting" since the best fit is constrained and is not simply a matter of computational convenience (see generally, Section 1–2 "Model Fitting" of *Nonlinear Parameter Estimation*). Unlike prior art methods noted above, this curve fitting is therefore a filtering method making the curve fitting less dependent upon any single data point. Consequently, artifact detection techniques during data gathering may be relaxed (or eliminated altogether) and the times required for successive blood pressure determinations are therefore significantly reduced.

It is further noted that the method of the present invention for computationally fitting a curve to an oscillometric envelope does not require all of the envelope data to be gathered in one blood pressure determination. Indeed, envelope data points from prior determinations can be combined thereby providing inherent artifact rejection. Moreover, the data points on fitted curves of prior determinations may be substituted for some of the data points for a current determination. Therefore, a current determination may proceed with as few as four or five cuff pressures and still provide a more accurate and faster determination. In this regard, it is noted that the most recent prior determinations may be weight-averaged so as to provide a weighted-averaged prediction of the next determination.

More particularly, the Gaussian curve fitting method employs a set of three parameters obtained from previous blood pressure determinations:

(1) the envelope amplitude, (2) the mean, and (3) the deviation from the mean.

The method of the invention may use the parameters of the previous determination to generate data points that are then used in a subsequent determination. The method of the invention may additionally or alternatively calculate a weighted average of the parameters from several previous determinations, with the parameters from more recent determinations being weighted more heavily than the parameters from older determinations. The weighted function therefore includes a predictive capability to handle changing blood pressure over time.

More particularly, it is noted that data from the current determination may be used to shift the expected curve to the correct pressure vicinity. Essentially this amounts to a horizontal displacement of the expected curve so that it more closely fits the most recently measured data. Data from the current determination may also be used to scale the curve to correspond to any changes in magnitude since the previous determination. Both the shifting and the scaling may be done at any pressure level; however, as a practical matter, the shifting is done on the basis of the first few pressure levels in a determination of which a complex is actually detected (i.e., the systolic area) and the scaling is done subsequently at each step.

The Gaussian curve fitting also provides an uncertainty measure based upon the errors in the previous predictions and how well the expected curve fits the measured data from the previous determinations. This uncertainty number is used to specify limits around the actual prediction and may also be used as an indicator as to how fast the criterion for complex acceptance can be relaxed.

In general, the following algorithm is employed to predict a complex amplitude at the next pressure step;

1. Perform a conventional blood pressure determination including two complex amplitudes at each pressure level thereby producing a plurality of data points which define an oscillometric envelope, 2. Computationally fit a Gaussian curve to the data points defining the oscillometric envelope with the Gaussian curve being defined by three parameters: amplitude, mean, and deviation, 3. Store the three Gaussian parameters in a "previous determination" buffer (while purging older parameters if there is insufficient capacity in the buffer), 4. If predictive analysis is desired, compute a weighted average of the contents of the previous determination buffer to obtain an expected new set of parameters, with the most recent data being weighted the heaviest, 5. Start another blood pressure determination, 6. Predict the complex amplitude for the next pressure level using the expected envelope characteristics while calculating the uncertainty number (At this point, the monitor looks for complexes and once found does a deflate or inflate to some new cuff pressure target), 7. Shift the expected envelope along the pressure axis so that the amplitudes of the expected and measured data agree, thereby accounting for a change in blood pressure level, 8. Scale the expected envelope based upon whether the last prediction overestimated or underestimated the measured data, and 9. Repeat the steps beginning at Step 6 until the blood pressure determination is completed.

BRIEF DESCRIPTION OF THE DRAWINGS

For a fuller understanding of the nature and objects of the invention, reference should be had to the following detailed description of the preferred curve fitting method of the invention taken in connection with the accompanying drawings in which.

PREFERRED CURVE FITTING METHOD OF THE INVENTION

Figure 1:
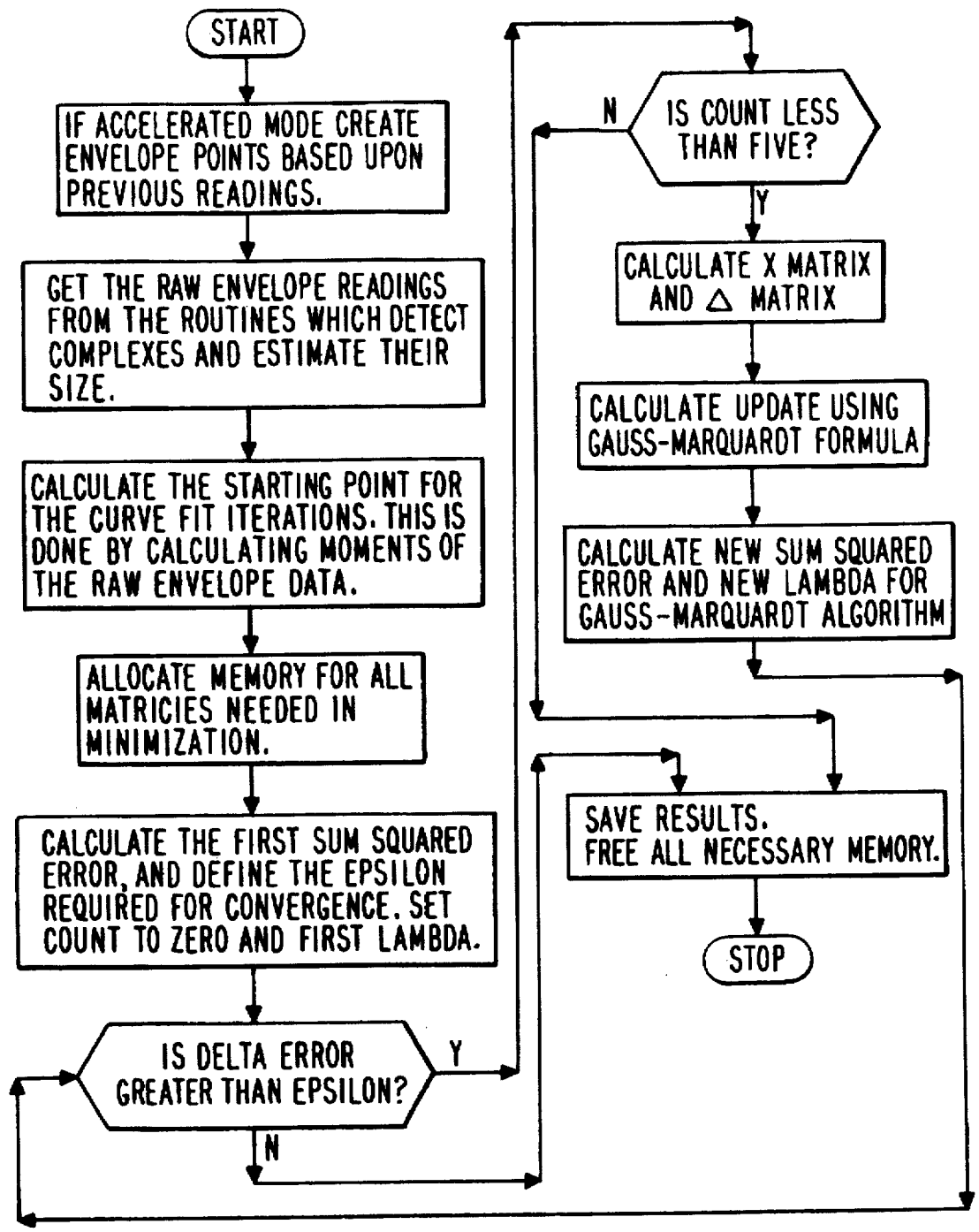
FIG. 1 is a flow chart of the curve fitting method of the invention and FIG. 2 is a graph of oscillometric data points and the Gaussian curve fitted thereto.

The preferred curve fitting method of the invention is to model fit a Gaussian curve to the data points obtained from a oscillometric blood pressure monitor (see flow chart of FIG. 1). The goal in model fitting the Gaussian curve to the data points is to find the best amplitude (A), mean (B), and deviation ($\sqrt{C/2}$). Best is defined as that (A, B, C) which minimizes the sum squared error between the Gaussian curve and the data points at each of the raw envelope pressures. A search in the (A, B, C) variable space is done until the minimization point is found.

The Gaussian curve is model fitted to the raw envelope data by a technique commonly known as the Gauss-Marquardt method. This method balances two optimization criteria. The first uses the gradient to find the best direction to move in searching for the minimum sum squared error. The second criterion uses the principle that the sum squared error derivatives must be zero at the minimum.

The starting point or first estimate of (A, B, C) must be determined to begin the algorithm. Since in an optimization problem it is possible to find a local minimum that is undesirable, care must be taken in the choice of this starting point. Preferably, a strategy is employed that simply estimates the Gaussian parameters based upon their definitions. For example, the mean in a Gaussian density function can be expected to correspond to the pressure at the envelope maximum. Therefore, the first moment of the complex magnitude with respect to cuff pressure using the raw envelope values is a good initial guess for the B parameter:

$$B_0 = \frac{\Sigma A_i P_i}{\Sigma A_i}$$

The second moment about the mean times 2 corresponds to our parameter C.

$$C_o = 2 \frac{\Sigma A_i (P_i - B_0)^2}{\Sigma A_i}$$

Finally, the maximum complex amplitude from the raw data points can be used as an initial guess for the A parameter. Note that this starting point only depends upon the use of raw data points.

The difference between the raw envelope amplitude and the desired curve at each of the raw cuff pressure values squared and summed is defined as the sum squared error.

$$\text{Error}(A,B,C) = \Sigma \; (A_i - A^* e^{-\frac{(P_i-B)^2}{C}})^2$$

This emphasizes that Error(A,B,C) is a function of A, B, and C and i is the index for the complexes. Now, Error(A, B,C) can be expressed as a column vector multiplication.

$$\text{Error}(A,B,C) = \Delta^T \Delta$$

$$\Delta^T = [\ldots A_i - A^* e^{-\frac{(P_i-B)^2}{C}} \ldots]$$

where superscript T is the transpose of a matrix.

The gradient can be found by forming the matrix grad:

$$\text{grad} = \left[ \frac{\partial \text{Error}}{\partial A} \quad \frac{\partial \text{Error}}{\partial B} \quad \frac{\partial \text{Error}}{\partial C} \right]$$

For any given point (A,B,C) in the independent variable space, moving in a direction opposite to the direction of the gradient, will tend to minimize the Error(A,B,C) function. Further note:

$$\text{grad} = -2 * \Delta^T * X$$

X is a matrix where:

$$X_{i1} = e^{-\frac{(P_i-B)^2}{C}}$$

$$X_{i2} = 2*A*\frac{(P_i-B)}{C} *e^{-\frac{(P_i-B)^2}{C}}$$

$$X_{i3} = A*\frac{(P_i-B)^2}{C^2} *e^{-\frac{(P_i-B)^2}{C}}$$

This means that the iterative formula to be used is:

$$[A_{NEW} B_{NEW} C_{NEW}]^T = [A_{OLD} B_{OLD} C_{OLD}]^T + k*\Delta^T*X,$$

where k is just some arbitrary constant which determines how far to move in the direction opposite to the gradient.

It is also known that the gradient is zero when the minimum has been achieved. By assuming linear variation of the gradient at some (A,B,C), an estimate for what (A,B,C) will be when the gradient is zero can be calculated. Specifically, $$\text{grad} = -2*\Delta^T*X$$

will equal zero if $\Delta = 0$.

Therefore, if $\Delta$ is expanded as a linear function of (A,B,C) around ($A_{OLD}, B_{OLD}, C_{OLD}$) and solved for (A,B,C) an iterative formula can be found for updating. The linearization is:

$$\Delta(A,B,C) = \Delta(A_{OLD},B_{OLD},C_{OLD}) - X(A_{OLD},B_{OLD},C_{OLD})*([ABC]^T - [A_{OLD}B_{OLD}C_{OLD}]^T).$$

Now set $\Delta(A,B,C) = 0$. This leaves:

$$\Delta(A_{OLD},B_{OLD},C_{OLD}) = X(A_{OLD},B_{OLD},C_{OLD})*([ABC]^T - [A_{OLD}B_{OLD}C_{OLD}]^T).$$

[A B C] can be found by a least squares method.

$$[A_{NEW} B_{NEW} C_{NEW}]^T = [A_{OLD} B_{OLD} C_{OLD}]^T + (X^T X)^{-1} X^T \Delta$$

The two updating formulas can be combined for the best possible effect. The first is very stable but converges slowly; the second is fast but unstable at times due to the calculation of the matrix inverse. It is the Gauss-Marquardt algorithm which balances these two strategies. The combined formula is:

$$[A_{NEW} B_{NEW} C_{NEW}]^T = [A_{OLD} B_{OLD} C_{OLD}]^T + (X^T X + \text{lambda}*I)^{-1} X^T \Delta$$

where I is the identity matrix.

The scalar variable lambda changes at each iteration step. If the error gets larger lambda is multiplied by 10, stabilizing the calculation. If the error gets smaller lambda is divided by 10 speeding the convergence.

For the purpose of illustration, the following Tables I and II list exemplary data and results that are acquired during a blood pressure determination by employing the Gauss-Marquardt method of the invention.

TABLE I

| Raw Envelope Data Cuff Pressure ($P_i$) | Complex Amplitude ($A_i$) |
|---|---|
| 137 | 174 |
| 137 | 158 |
| 124 | 321 |
| 124 | 260 |
| 113 | 679 |
| 114 | 692 |
| 103 | 1022 |
| 105 | 1261 |
| 94 | 1198 |
| 95 | 1166 |
| 84 | 1021 |
| 86 | 1093 |
| 76 | 750 |
| 78 | 927 |
| 69 | 573 |
| 70 | 611 |

This Table I is an example of raw data points of the nature that would be reasonably encountered in actual practice.

TABLE II

| Iteration | Sum Squared Error | Delta Error |
|---|---|---|
| 1 | 1029.8309 | -1113.947776 |
| 2 | 963.8274 | -66.003516 |
| 3 | 963.6516 | -0.175781 |
| 4 | 963.6505 | -0.001093 |
| 5 | 963.6508 | -0.000234 |

This Table II is an example of each iteration step of the Gauss-Marquardt method. It includes the sum squared error and the delta of the sum squared error. The algorithm stops when either a specified maximum number of iteration steps or a small delta error has occurred. This results in A=1209.0671, B=93.6863, and C=757.5957. Therefore, the Gaussian functions $$\text{Percent}_{sys}*A = A*e^{-\frac{(P_i-B)^2}{C}}$$

$$\text{Percent}_{dia}*A = A*e^{-\frac{(P_i-B)^2}{C}}$$

may be solved for P to obtain the systolic and diastolic pressures as fixed systolic and diastolic percentages of the mean. More specifically, solving these Gaussian functions with A=1209.0671, B=93.6863, and C=757.5957, the systolic and diastolic pressures are computed as fixed percentages of A as follows:

$$P_{sys} = +\sqrt{-\ln(\text{Percent}_{sys})C} + B$$

or $$P_{sys} = +\sqrt{-\ln(\text{Percent}_{sys})757.5957} + 93.6863$$

and $$P_{dia} = -\sqrt{-\ln(\text{Percent}_{dia})C} + B$$

or $$P_{dia} = -\sqrt{-\ln(\text{Percent}_{dia})757.5957} + 93.6863$$

Figure 2:
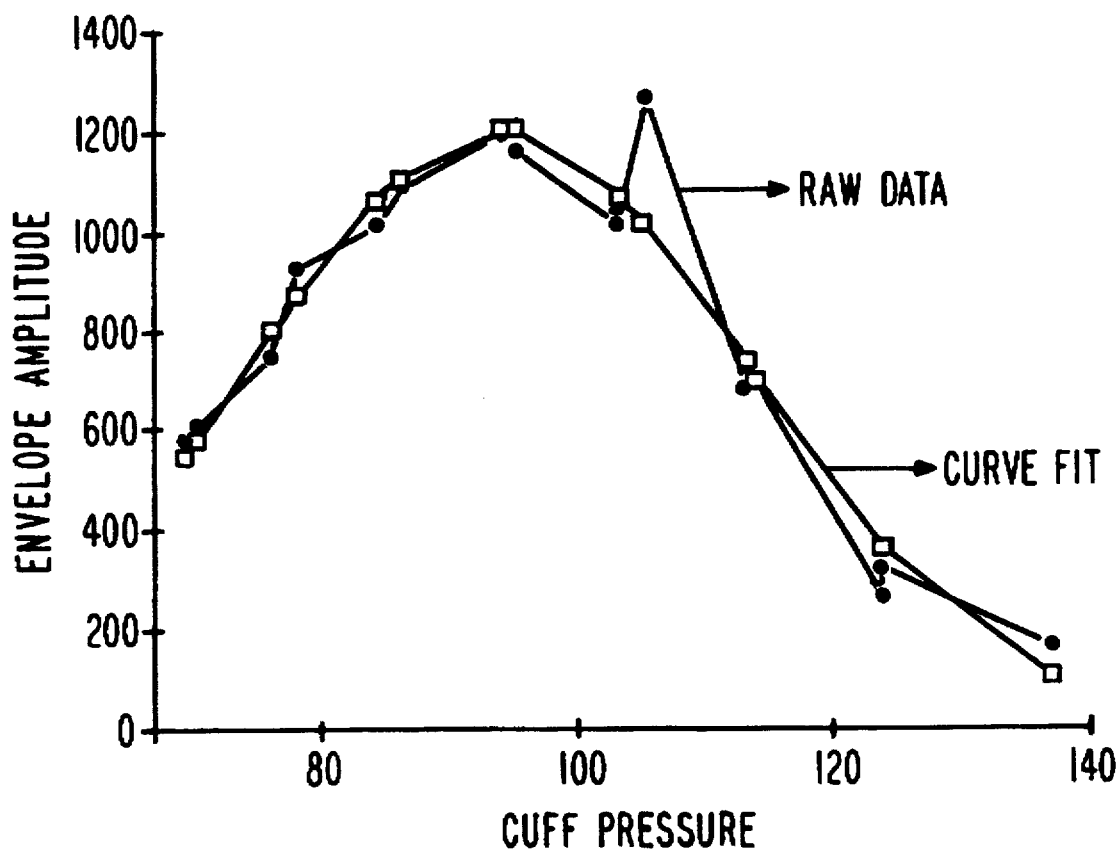

For even better illustration, the graph of FIG. 2 graphically illustrates the data points and the fitted Gaussian curve thereto.

The method of this invention has a number of additional advantages. First, the information gained in previous determinations may be easily incorporated into subsequent determinations. Specifically, the (A,B,C) found in the previous determination may be used to generate artificial points, such as by computing diastolic and systolic data points, that are then included as raw envelope data in the current determination. This has been found to be particularly useful in the stat modes which optimally use very few steps to calculate blood pressure. While it does introduce a delay in showing the true blood pressure after a change, it has the feature that it stabilizes the algorithm so that a few bad raw envelope points (relative to the total data points) do not cause significant error in the final blood pressure. Second, specific points can be weighted differently. For example, the method of the invention may be modified so that points that have less certainty have less effect on the actual curve fit.

It is well known in the art that there may be skew in a particular real envelope. In a typical oscillometric envelope the systolic side or the diastolic side is a little steeper than the other side. This has empirically been found to be a highly variable property of the envelope but must still be accounted for. In variation of the method of the invention, a first Gauss-Marquardt curve fit is performed to obtain the approximate position and size of the envelope (see FIG. 2). This is followed by a filtering step in which the points in the raw envelope which are not close to the first curve fit (e.g. distanced by 10% of the magnitude) are rejected. A second Gauss-Marquardt fit is then performed on the filtered raw envelope data. Finally, the filtered raw envelope data is divided into two sets: a systolic set which is all data with pressures greater than the MAP determined from the second curve fit and a diastolic set which is all data with pressures less than MAP. On each side of MAP a slight adjustment is made to reduce the error even further. In this final adjustment only the C parameter is allowed to vary.

Although the method of this invention has been described in its preferred form with a certain degree of particularity with regard to data points, it is understood that integral values (see for example, U.S. Pat. Nos. 4,889,133 and 4,949,710, incorporated by reference herein) representative of an oscillometric envelope may be utilized during the curve fitting method of this method in lieu of data points without departing from the spirit and scope of the invention. Hence, the term "data values" as used in the following claims is defined to include all representations of on oscillometric envelope such as, but not limited to, data points and integral values.

Now that the invention has been described,

What is claimed is:

1. A method for measuring the blood pressure of a subject, comprising the steps of:

obtaining from the subject a plurality of oscillometric data values from at least one complex amplitude taken at a plurality of pressure levels;

selecting a function curve having a physiologically-expected shape of an oscillometric envelope, the function curve being defined by at least one parameter;

computationally model fitting the function curve to the plurality of data values by computing the parameter of the function curve that minimizes the error between the function curve and the data values at the respective pressure levels thereby approximating the oscillometric envelope based upon data values; and computing a systolic pressure and a diastolic pressure based upon the curve.

2. The method as set forth in claim 1, wherein the step of computationally model fitting a function curve to the plurality of data values further comprises the step of storing computations of at least one previous determination for use in a subsequent determination.

3. The method as set forth in claim 1, wherein the step of computationally model fitting a function curve to the plurality of data values comprises the step of computationally model fitting a Gaussian curve to the plurality of data values.

4. The method as set forth in claim 3, wherein the step of computationally model fitting a Gaussian curve to the plurality of data values employs the Marquardt method.

5. The method as set forth in claim 4, wherein the step of computationally model fitting a Gaussian curve to the plurality of data values by the Marquardt method is over Gaussian parameters of amplitude, mean, and deviation.

6. The method as set forth in claim 5, wherein the step of computationally model fitting a Gaussian curve to the plurality of data values by the Marquardt method over the Gaussian parameters of amplitude, mean and deviation further comprises the step of storing the Gaussian parameters of at least one previous determination for use in a subsequent determination.

7. The method as set forth in claim 6, wherein the step of computationally model fitting a Gaussian curve to the plurality of data values by the Marquardt method over the Gaussian parameters of amplitude, mean and deviation and storing the Gaussian parameters of at least one previous determination for use in a subsequent determination comprises the steps of storing the Gaussian parameters of a plurality of previous determinations and computing a weighted average of the Gaussian parameters of the previous determinations.

8. The method as set forth in claim 7, wherein the step of computing a weighted average of the Gaussian parameters of the previous determinations includes the step of weighing the Gaussian parameters of the more recent determinations heavier than older determinations.

9. The method as set forth in claim 6, wherein the step of computationally model fitting a Gaussian curve to the plurality of data values by the Marquardt method over the Gaussian parameters of amplitude, mean and deviation and storing the Gaussian parameters of at least one previous determination for use in a subsequent determination comprises the step of predicting an expected new Gaussian parameters and then performing another blood pressure determination utilizing the expected new Gaussian parameters.

10. The method as set forth in claim 6, wherein the step of computationally model fitting a Gaussian curve to the plurality of data values by the Marquardt method over the Gaussian parameters of amplitude, mean and deviation and storing the Gaussian parameters of at least one previous determination for use in a subsequent determination comprises the steps of storing the Gaussian parameters of at least one previous determination, generating data values based upon such previous determination, and using the generated data values in a subsequent determination.

11. The method as set forth in claim 1, wherein the step of computationally model fitting a function curve to the plurality of data values such that the function curve approximates an oscillometric envelope based upon the data values comprises the step of scaling an expected envelope.

12. The method as set forth in claim 1, wherein the step of computationally model fitting a function curve to the plurality of data values such that the function curve approximates an oscillometric envelope based upon the data values comprises the step of shifting an expected envelope along the pressure axis so that the amplitudes of the expected and measured data agree, thereby accounting for a change in blood pressure level.

13. The method as set forth in claim 1, wherein the step of computationally model fitting a function curve to the plurality of data values such that the function curve approximates an oscillometric envelope based upon the data values further includes the steps of filtering the data values to reject the data values that are not close to the fitted function curve and then computationally fitting another curve to the remaining data values, from which the systolic pressure and diastolic pressure are computed.

14. The method as set forth in claim 1, wherein the step of computationally model fitting a function curve to the plurality of data values such that the function curve approximates an oscillometric envelope based upon the data values comprises the step of identifying the data values relevant to the computation of systolic pressure and the data values relevant to the computation of diastolic pressure and then computing a systolic curve to the systolic data values and computing a diastolic curve to the diastolic data values and wherein the steps of computing a systolic pressure and a diastolic pressure based upon the curve is performed relative to the systolic curve and the diastolic curve, respectively.

* * * * *